United States Patent
Scoggins et al.

(10) Patent No.: US 6,832,254 B1
(45) Date of Patent: Dec. 14, 2004

(54) METHOD AND APPARATUS FOR ASSOCIATING AN END-TO-END CALL IDENTIFIER WITH A CONNECTION IN A MULTIMEDIA PACKET NETWORK

(75) Inventors: Shwu-Yan Chang Scoggins, Cary, NC (US); Charles Michael Brown, Raleigh, NC (US); David John Jarzemsky, Raleigh, NC (US); Stanley Wayne Joyner, Milpitas, CA (US); Kathleen Kelley Schellenberger, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 801 days.

(21) Appl. No.: 09/618,334

(22) Filed: Jul. 18, 2000

Related U.S. Application Data

(60) Provisional application No. 60/150,271, filed on Aug. 23, 1999.

(51) Int. Cl.[7] .............................................. G06F 15/16
(52) U.S. Cl. ....................... 709/227; 709/223; 709/229
(58) Field of Search .................................. 709/223, 229, 709/227, 249, 224; 370/352, 354, 410, 426, 431, 254, 395, 389, 347, 232, 468, 229, 262, 392; 705/412; 340/825; 455/426

(56) References Cited

U.S. PATENT DOCUMENTS

| | | | |
|---|---|---|---|
| 5,682,325 A | | 10/1997 | Lightfoot et al. |
| 5,687,167 A | * | 11/1997 | Berlin et al. ................. 370/254 |
| 5,774,668 A | * | 6/1998 | Choquier et al. ........... 709/223 |
| 5,812,527 A | * | 9/1998 | Kline et al. .................. 370/232 |
| 5,901,352 A | * | 5/1999 | St-Pierre et al. ............ 455/426 |
| 5,936,964 A | * | 8/1999 | Valko et al. ................. 370/468 |
| 6,128,305 A | * | 10/2000 | Hjalmtysson et al. ....... 370/410 |
| 6,134,591 A | * | 10/2000 | Nickles ....................... 709/229 |
| 6,147,994 A | * | 11/2000 | Duree et al. ................. 370/392 |
| 6,167,389 A | * | 12/2000 | Davis et al. ................. 705/412 |
| 6,243,373 B1 | | 6/2001 | Turock ....................... 370/352 |
| 6,295,292 B1 | | 9/2001 | Voit et al. ................... 370/352 |

(List continued on next page.)

FOREIGN PATENT DOCUMENTS

| | | |
|---|---|---|
| EP | 0629091 | 12/1994 |
| EP | 0658063 | 6/1995 |

OTHER PUBLICATIONS

Holdrege, MultiService Switching Forum Requirements Input to MEGACO, Apr. 1999; http://quimby.gnus.org/internet-drafts/draft-ieft-megaco-msf-reqs-01.txt.*

(List continued on next page.)

*Primary Examiner*—Thong Vu
(74) *Attorney, Agent, or Firm*—Withrow & Terranova, PLLC

(57) ABSTRACT

Method and apparatus for associating an end-to-end call identifier with a connection in a multimedia packet network. An end-to-end call identifier (EECID) is provided to uniquely identify a call leg across a packet network, regardless of the number of nodes used in completing the network path. The EECID allows for call association with a bearer connection so that high level call processing and low level bearer connection management can function independently but correlated by media gateways and media gateway controllers. Either a media gateway or media gateway controller can generate the EECID before establishing a connection for a call. The EECID is then sent to remote media gateways and media gateway controllers. The bearer connection can be setup by a media gateway at either end of the connection with respect to where the EECID is generated. The invention is useful in a connection oriented packet network that is connected to a TDM telephone network through a media gateway controlled by a media gateway controller.

31 Claims, 14 Drawing Sheets

U.S. PATENT DOCUMENTS

| | | | |
|---|---|---|---|
| 6,404,746 B1 * | 6/2002 | Cave et al. ................. | 370/262 |
| 6,421,718 B1 * | 7/2002 | Lamkin et al. ............. | 709/223 |
| 6,445,695 B1 | 9/2002 | Christie, IV ................ | 370/352 |
| 6,584,094 B2 | 6/2003 | Maroulis et al. ............ | 370/352 |
| 6,597,686 B1 | 7/2003 | Smyk ......................... | 370/352 |
| 6,600,735 B1 * | 7/2003 | Iwama et al. ............... | 370/352 |
| 6,628,617 B1 | 9/2003 | Karol et al. ................ | 370/237 |
| 6,671,367 B1 * | 12/2003 | Graf et al. .................. | 379/229 |
| 2002/0057672 A1 | 5/2002 | Komuro ..................... | 370/352 |

OTHER PUBLICATIONS

Arango; draft–huitema–MGCP–v0r1–01.txt Tue Dec. 8 19:59:36 1998 1; www.cs.columbia.edu/sip/drafts/mgcp.pdf.*

Media Device Control Protocol v0.3—Sijben, Buckley, Wachter, Seegers.. (1999); search.ietf.org/internet–drafts/draft–sijben–megaco–mdcp–01.ps.*

RTP payload multiplexing between IP telephony gateways, Subbiah, B.; IEEE May 1999.*

Mobility Support using SIP—Wedlund, Schulzrinne (1999); ntrg.cs.tcd.ie/htewari/papers/Wedl9908_Mobility.pdf.*

Session Initiation Protocol (SIP)—Wong (1999); www.cs.iit.edu/~cs548/SIP_Paper.pdf.*

Pearce, "CS–2 Enhancements For User Interaction"; Telecommunications 1998; Mar. 29–Apr. 1, 1998; vol. 451, pp. 235–239.

Jeffrey, M. et al. "A Signalling Architecture For Multimedia Services"; IEEE; vol. 14, Jun. 1992; pp. 604–608.

Blankers, P. "Functional Modeling for Target B–ISDN Signalling"; IEEE; Dec. 6, 1992; pp. 1166–1171.

Boese et al. "The Multimedia SCP"; IEEE; Nov. 1987; pp. 1–5.

* cited by examiner

METHOD AND APPARATUS FOR ASSOCIATING AN END-TO-END CALL IDENTIFIER WITH A CONNECTION IN A MULTIMEDIA PACKET NETWORK

CROSS-REFERENCE TO RELATED APPLICATIONS

This application claims priority from commonly assigned, provisional patent application Ser. No. 60/150,271, entitled, "Improved Packet Media Gateway," filed Aug. 23, 1999, now abandoned, which is incorporated herein by reference.

Much of what is disclosed in this application is also disclosed in commonly assigned application Ser. No. 09/618,507, entitled "Method and Apparatus for Improved Call Setup in a Multimedia Packet Network" filed on the same date as the present application, which is incorporated herein by reference.

BACKGROUND

1. Field of the Invention

This invention is related to multimedia packet networks. Specifically, this invention relates to a mechanism to allow such a packet network to more effectively carry telephony messages, and to more efficiently interface with the public switched telephone network (PSTN).

2. Description of the Problem Solved

Evolution of the PSTN has accelerated in recent years; however, most of the PSTN still operates on circuit switched, time division multiplexed (TDM) connections. Integrated services digital network (ISDN) bearer channels often provide transport. In parallel with the PSTN, a packet based data network has evolved. This data network has largely been used for Internet traffic and data networking. Although these networks have been mostly separate until recently, the two networks are starting to merge. The merger of these networks requires that voice traffic be carried over packet networks, and further that such packet networks be able to seamlessly integrate with traditional circuit switched networks, as the two types of networks may carry different call legs of the same call.

FIG. 1 illustrates a typical TDM, PSTN call. Caller 101 places a call to callee 105. The call goes through end office A, 102, over some type of trunk bearer channel to toll office 103, then to end office B, 104, and finally to the callee. Such calls may pass through multiple toll offices, or may be connected directly from one end office to another. In any case, a path of circuits for the call is maintained throughout the call. Signaling between offices is typically provided by an ISUP (ISDN user part) connection. ISUP signaling is well understood and is standard in the telecommunications industry. For more information on ISUP signaling, see the various International Telecommunications Union (ITU) Recommendations pertaining to telephone signaling, including Q.761, Q.764 and Q.931, the most recent versions of which at the time of filing this application am incorporated herein by reference.

FIG. 2 illustrates a call which is similar to the TDM call of FIG. 1; however, in this case, the call is transported from one end office to another (called switch offices, 202 and 204, in this case) via a packet switched network 203. This fact is, in theory, transparent to caller 201 and callee 205. ISUP+ or SIP+ provides signaling in this case. ISUP+ is essentially the same as ISUP except that ISUP+ signals contain extra fields for packet or cell based network information. An International Telecommunications Union (ITU) recommendation has been proposed for ISUP+ as of the filing date of this application as ITU Q.BICC. SIP stands for "session initiation protocol" and is a well-known standard. SIP and SIP+ are described in document RFC 2543, published by the Internet Engineering Task Force (IETF), March, 1999 which is incorporated herein by reference. SIP and SIP+ provide the same type of signaling for control of calls, but are more oriented towards packet based networks.

The network of FIG. 2 has been conceptualized for some time, and standards groups and conference groups have written extensively about how to make such a network work in everyday use. In order for the call leg which is handled by the packet network to seamlessly connect with the call legs handled by TDM switching offices, media provided by one type of network must be converted into media provided by the other. This conversion is referred to as circuit emulation services (CES) in an ATM network. The device that provides this conversion is called a media gateway (MG). In the network of FIG. 2, a media gateway handles each end of the bearer connection through packet network 203. The media gateway terminates bearer media streams from both the switched circuit TDM network, and the packet network. The media gateway and the network it serves may be capable of processing audio and video (hence the term "multimedia packet network"). The media gateway is capable of full duplex media translations. It may also provide other features such as conferencing.

Each media gateway is associated with a media gateway controller (MGC). The media gateway is "dumb" in that it does not have call processing capabilities. The call processing capabilities for the network reside in the MGC. An MGC provides the signaling for call control and controls the call state of a media gateway. The protocol used by the MGC to control the MG is called the media gateway control protocol (or the "Megaco" protocol). Megaco is an application layer protocol which is also described in ITU Recommendation H.248, which shares a common text with the IETF Internet Draft "Megaco Protocol," and which is incorporated herein by reference. The "Megaco Protocol" Internet Draft first became an IETF working document in March, 1999. Within the Megaco protocol, session description protocol (SDP) can be used to describe bearer channel terminations, which are being controlled by the MGC's. SDP is described in document RFC 2327, published by the IETF, April 1998, which is incorporated herein by reference. Throughout the rest of this disclosure we will refer to Megaco as "Megaco/H.248."

Despite the fact that the theoretical workings of a network like that shown in FIG. 2 have been widely explored, such networks have seen relatively little everyday use. The reason is that there are still problems to be overcome before such networks exhibit the same very high quality of service for voice traffic that users of the PSTN have come to expect. One such problem stems from the fact that there is no dedicated physical path for a call through a packet network, and therefore no way to identify a particular media stream to be associated with a particular call.

A packet switched network, used for transport of audio and video media streams, is typically based on asynchronous transfer mode (ATM), frame relay (FR), and Internet protocol (IP) technologies. Public ATM networks generally operate according to the user network interface (UNI). The UNI is described in the book, "ATM User Network Interface (UNI) Specification Version 3.1" by the ATM Forum, published by Prentice Hall PTR, June, 1995, which is incorporated herein by reference. An update to the UNI version 3.1, "ATM User-Network Interface (UNI) Signaling Specification 4.0" was published by the ATM Forum in July, 1996, and is incorporated herein by reference. For private ATM networks, the private network to network interface (PNNI) describes the ATM interface. PNNI is covered in the ATM forum document "PNNI addendum for the network call correlation identifier" published by the ATM forum in July 1999, which is incorporated herein by reference. In ATM, fixed length cells carry packetized data. Each cell that is sent through the network has a virtual channel identifier, and other addressing information; however, each node in the network handles many cells that are associated with different media streams. Therefore, each call leg on the ATM network may actually go through many different network nodes and many different virtual circuits to complete the network path. It is impossible for an MGC and a media gateway to correlate the call leg throughout its path with a particular call. Since the nodes in the network are unaware of which call's cells are being sent when, it is difficult to maintain control of the call throughout the network in real time to maintain an appropriate level of quality of service. What is needed is a way within the Megaco/H.248 protocol to absolutely identify a media stream in the network as being associated with a particular call.

SUMMARY

The present invention solves the above-described problem by providing an end-to-end call identifier (EECID) for use in an ATM or other type of packet switched network which serves as a transport network for real-time audio and video media streams. The EECID is used to identify a call leg uniquely across the packet network, regardless of the number of nodes used in completing the network path. The EECID allows a call to be identified uniquely within the packet network, so that the media gateway can process the call accordingly.

Either a media gateway or a media gateway controller, at either the originating or terminating end of the call or the packet network can generate the EECID. In describing the invention, we use "originating" and "terminating" to refer to the calling and called ends of the call path, respectively. We use the terms "near-end" and "far-end" to refer to the end of the path relative to where the particular process being discussed is taking place, usually relative to where the EECID is being created and/or assigned. The terms "near-end" and "far-end" are used independently of the terms "originating" and "terminating." In connection with call setup, the terms "forward" and "backward" refer to which end initiates the bearer connection through the packet network. "Forward" refers to a process where the originating end sets up the connection, and "backward" refers to a process where the terminating end sets up the connection.

In one embodiment of the invention, a media gateway creates the EECID, determining its value after receiving a command from its media gateway controller (MGC) that a connection for the call is to be established. The value can be a unique, randomly created number, or the media gateway can use another number that is associated with some part of the call path, such as a call identifier (call-ID), backwards network connection identifier (BNC-ID), or a network call correlation identifier (NCCI). The media gateway sends the EECID to the associated media gateway controller so that it can be forwarded to the far-end media gateway controller and the far-end media gateway. The media gateway then establishes a corresponding bearer connection so that the EECID is associated with the bearer connection and the call, and notifies its MGC that the call has been established. Once the EECID has been created, the steps can be performed in any order.

In another embodiment of the invention, a media gateway controller (MGC) creates the EECID, determining its value after receiving a notification to establish a connection and negotiating connection parameters with a far-end MGC. The notification can either be an offhook notification or a request from the far-end MGC to negotiate connection parameters, depending on whether the near-end MGC is the originating MGC or the terminating MGC. Again, the EECID can be a unique, randomly generated number. The EECID can also be a number associated with some other part of the call path, such as a session identifier (session-ID) or a BNC-ID. Once the EECID has been created and assigned, the near-end MGC sends the EECID to its associated media gateway, and sends the EECID to the far-end MGC so that the EECID is associated with the call and the bearer connection which will be established through the network. Once the EECID has been created, the steps can be performed in any order. Regardless of whether the MG or MGC determines the EECID, once both the near-end and far-end media gateways have the EECID and know which call it is associated with, the EECID can be included in packets which are part of the media stream. For example, if the packet network is an ATM network, the EECID is included in ATM cells that make up the media stream to uniquely identify the call.

The invention is implemented by software in combination with the hardware of the media gateway and media gateway controller. The software which implements many aspects of the present invention can be stored on a media. The media can be magnetic such as diskette, tape or fixed disk, or optical such as a CD-ROM. Additionally, the software can be supplied via a network. A media gateway is essentially a switching system containing switching fabrics, a computing module, network interfaces, and other resources. The network interfaces are implemented by adapters which are connected to switching fabrics to allow access to the system from the networks. Input/output modules or adapters allow software to be loaded and various maintenance functions to be performed. A computing module contains a processor and memory that execute the software and provide the means to control the operation of the media gateway to implement the invention.

The media gateway controller can also be a switching system, but would more typically be a type of workstation containing a bus such a personal computer interconnect (PCI) bus. A workstation that typically implements the invention includes a plurality of input/output devices and adapters for connection to the necessary networks. A system unit includes both hardware (a central processing unit and memory) and software which together provide the means to implement the media gateway controller.

The invention operates in a network in which media gateways act as endpoints to call legs being carried on a bearer channel between networks. Each media gateway is controlled by and connected to a media gateway controller. An MGC uses the previously mentioned Megaco/H.248 protocol to control its media gateway, and the invention provides an extension to the Megaco/H.248 protocol to move the EECID between media gateways and media gateway controllers. It should be noted that the invention can be used in a network in which only one MGC controls multiple media gateways, or in a network in which one media gateway manages both ends of a connection. In the latter case it is still important to be able to identify the call within the media gateway.

DETAILED DESCRIPTION

Figure 1:
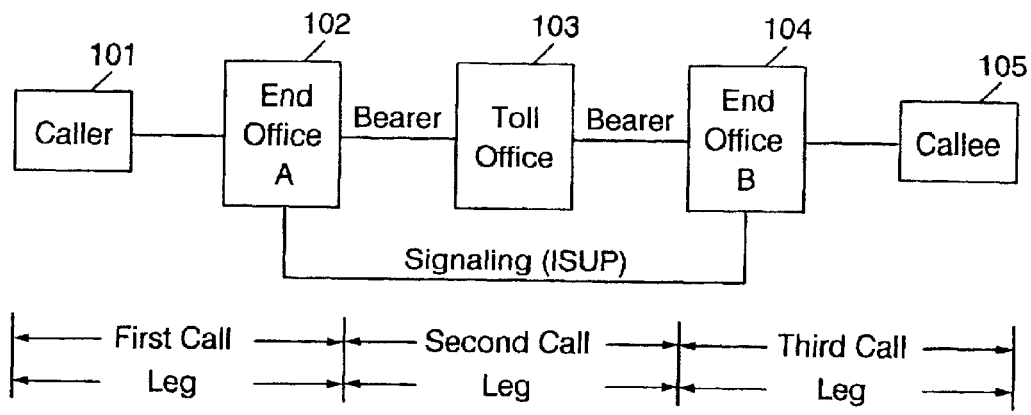
FIG. 1 conceptually illustrates a prior-art telephone connection through the public switched telephone network.
Figure 2:
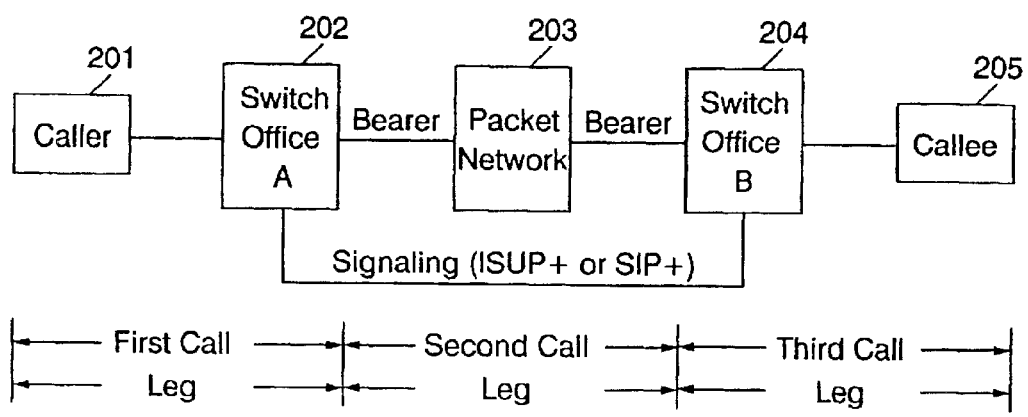
FIG. 2 conceptually illustrates a telephone connection similar to that of FIG. 1, except that one call leg goes through a packet switched network.
Figure 3:
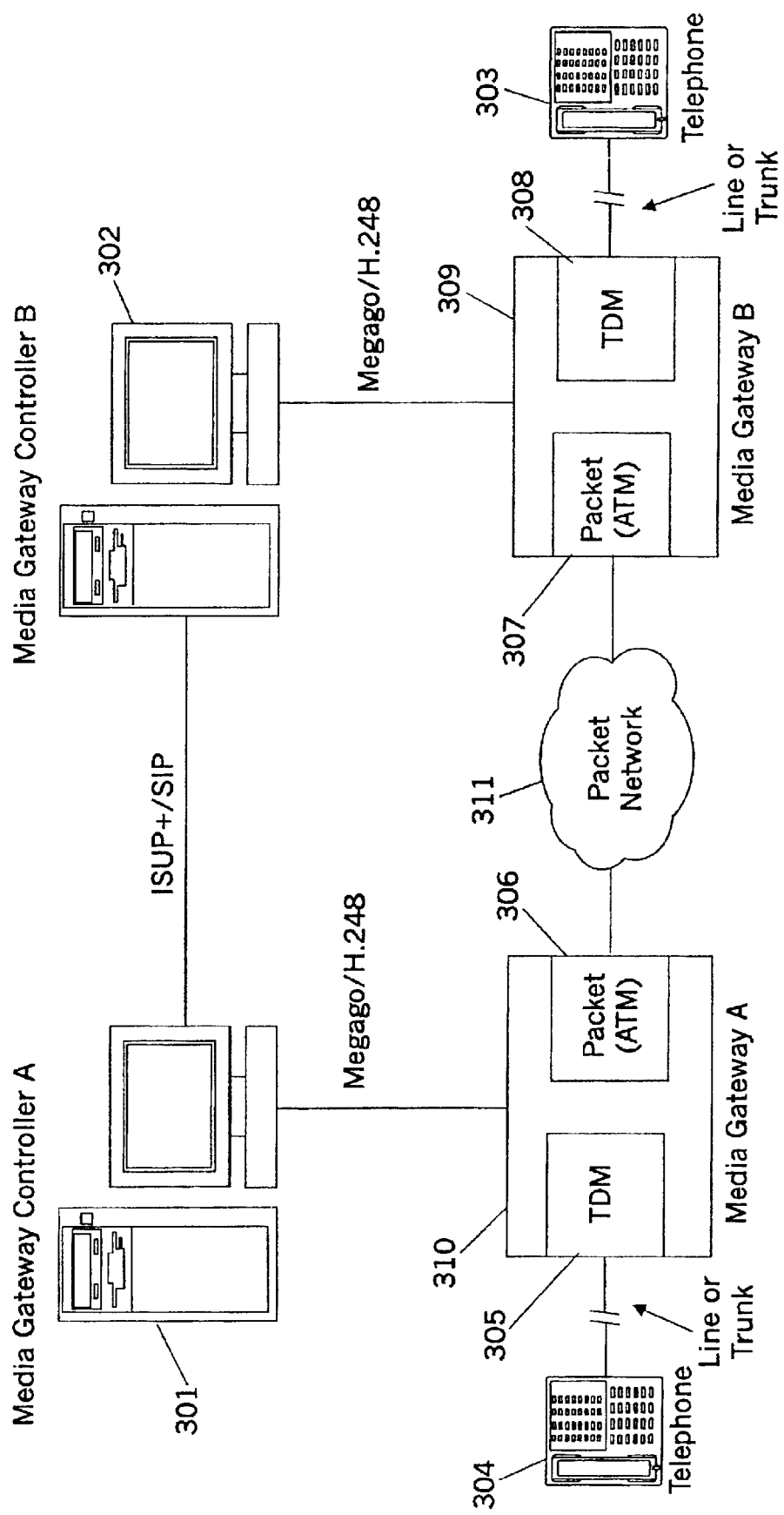
FIG. 3 is a block diagram of one network in which the present invention is used.

FIG. 3 illustrates one architecture in which the present invention can be used. According to FIG. 3, telephone 304 is where a call originates. Telephone 303 is where a call terminates. Telephones 303 and 304 are shown as illustrations only. In reality, they can be directly connected to the media gateways or can be connected through extensive TDM networks. In the latter case, lines going into the media gateways would actually be TDM trunks. Media gateway A, 310, is the originating media gateway and media gateway B, 309 is the terminating media gateway. The media gateways of FIG. 3 convert voice to ATM. We therefore refer to this network architecture as voice and telephony over ATM, or "VTOA" architecture. Media gateway controller A, 301, controls media gateway A. Media gateway controller B, 302, controls media gateway B. Alternatively both media gateways can be controlled by a single MGC. Media gateway A includes TDM endpoint 305 and packet endpoint 306. Media gateway B includes TDM endpoint 308 and packet endpoint 307. Packet network 311 serves as the transport network through which bearer channels are established to interconnect calls between the two media gateways. This network and the endpoints to which it is connected can be frame relay, ATM, IP, or some other type of packet network. For illustrative purposes, most of the discussion refers to an ATM network. The media gateway controllers communicate with each other via ISUP+, SIP, or SIP+. It is also possible to use a nonstandard protocol, specific to the manufacturer of the media gateway controllers and media gateways.

Either a media gateway or a media gateway controller can generate the end-to-end call identifier (EECID), as determined by the network designer. The EECID is used to identify a call leg uniquely across the ATM network, regardless of the number of nodes used in completing the network path. The EECID allows the MGC's, the media gateways, and any nodes in the bearer path to identify the call uniquely. Note that media gateway controller A, 301, controls media gateway A, 310, using the Megaco/H.248 protocol, an application layer protocol for media gateway control. Likewise, media gateway controller B, 302, controls media gateway B, 309, using the same Megaco/H.248 protocol. The media gateway or media gateway controller at either end can generate the EECID, regardless of which end is the originating end for the call and which end is the terminating end for the call.

Figure 4:
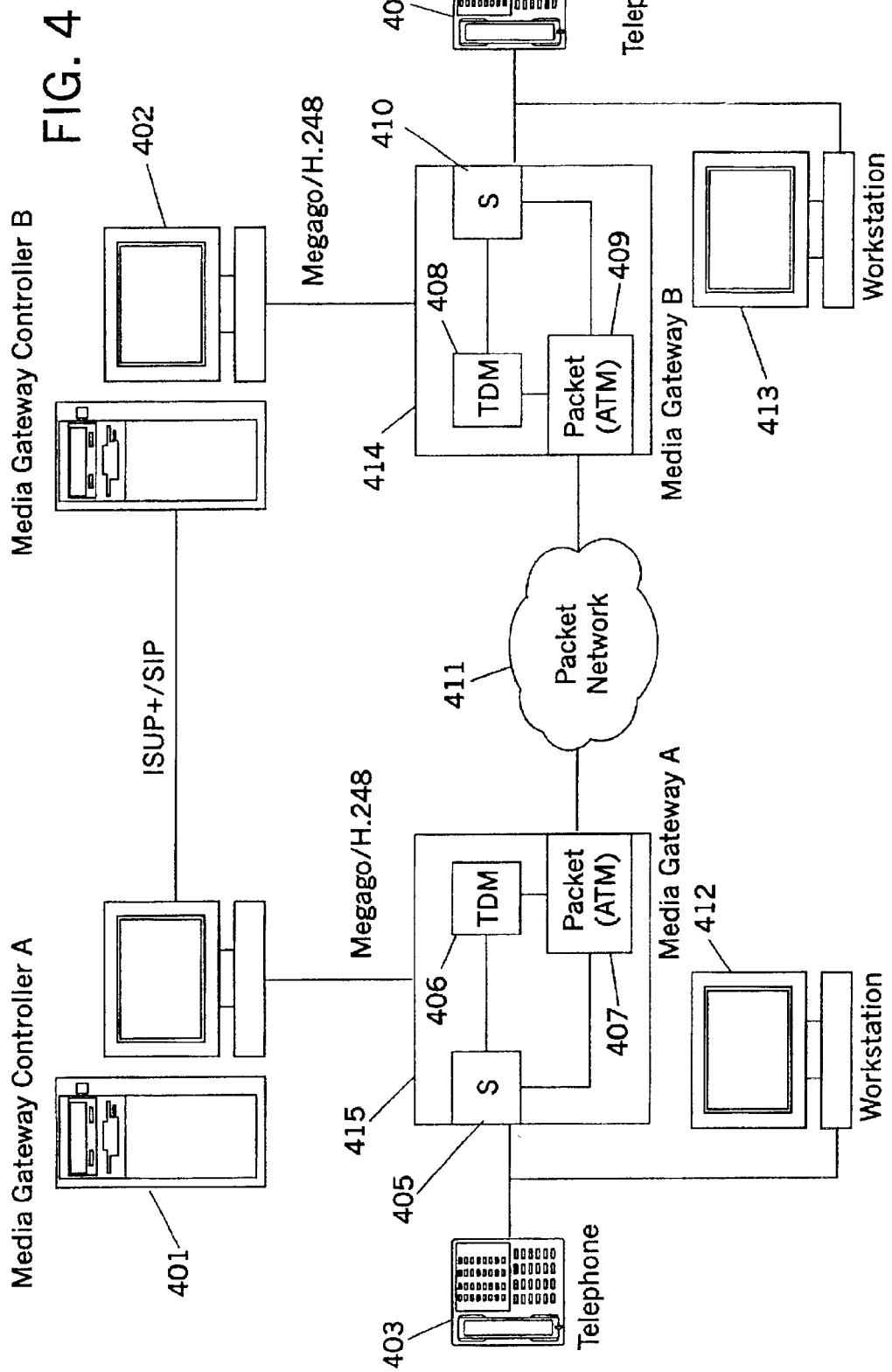
FIG. 4 is a block diagram of a different network in which the present invention is used.

FIG. 4 illustrates a slightly different architecture in which the invention is used. According to FIG. 4, media gateway controller A, 401, controls media gateway A, 415, using the Megaco/H.248 protocol and media gateway controller B, 402, controls media gateway B, 414, using the Megaco/H.248 protocol. In FIG. 4, 403 is the originating telephone and 404 is the terminating telephone. ATM network 411 serves as the transport network. Again, any of the media gateway controllers or media gateways can generate an EECID to identify calls being handled by the network. The main difference between the network of FIG. 4 and the network of FIG. 3 is that the network of FIG. 4 supports digital subscriber loop, or DSL. DSL comes in various types such as aDSL, sDSL and hDSL, and so "xDSL" is used to designate DSL in FIG. 4. In this case each media gateway includes a splitter; 405 in the case of media gateway 415 and 410 in the case of media gateway 414. TDM terminations 406 and 408 and ATM endpoints 407 and 409 each reside in their respective media gateways and allow both data and TDM voice to be transported across the ATM network 411. The splitters 405 and 410 split the voice from the data. The data connection from user terminal 412 is completed through splitter 405 to ATM termination 407 in the case of media gateway A. The data connection from user terminal 413 is completed through splitter 410 to ATM termination 409 in the case of media gateway B. Otherwise, the operation of the network in FIG. 4 is essentially the same as the operation of the network of FIG. 3.

Many aspects of the invention are implemented through enhancements to the previously mentioned Megaco/H.248 protocol. The connection model for the protocol describes logical entities, or objects, within the media gateway that can be controlled by the media gateway controller. The model relies on extractions, primarily terminations and contexts. A termination sources and/or sinks one or more media streams. A context is an association between a collection of terminations.

In general, an "add" command is used to add terminations to contexts. A termination may be moved from one context to another with a "move" command. A termination exists in, at most, one context at a time. A non-packet termination can exist outside of a context. Property values can be set for terminations by including appropriate descriptors as parameters to the various commands in the Megaco/H.248 protocol. A termination in a context may have its value changed by the "modify" command. Other commands that are important to the implementation of the invention will be discussed later.

As previously mentioned, according to one aspect of the invention an end-to-end call identifier (EECID) is associated with a call, and with a bearer path through the packet network, which completes a call leg. When we say the EECID is associated with a call or a path, we mean that all of the nodes and devices involved in maintaining a call leg are aware of which call to which specific Directory Numbers (DN's), or other user addresses are associated with each packet of information which flows through the relevant part of the network. Depending on the type of underlying networks and/or protocols the EECID can be carried across the network in various ways. Details of some possible signaling will be discussed later.

Figure 5:
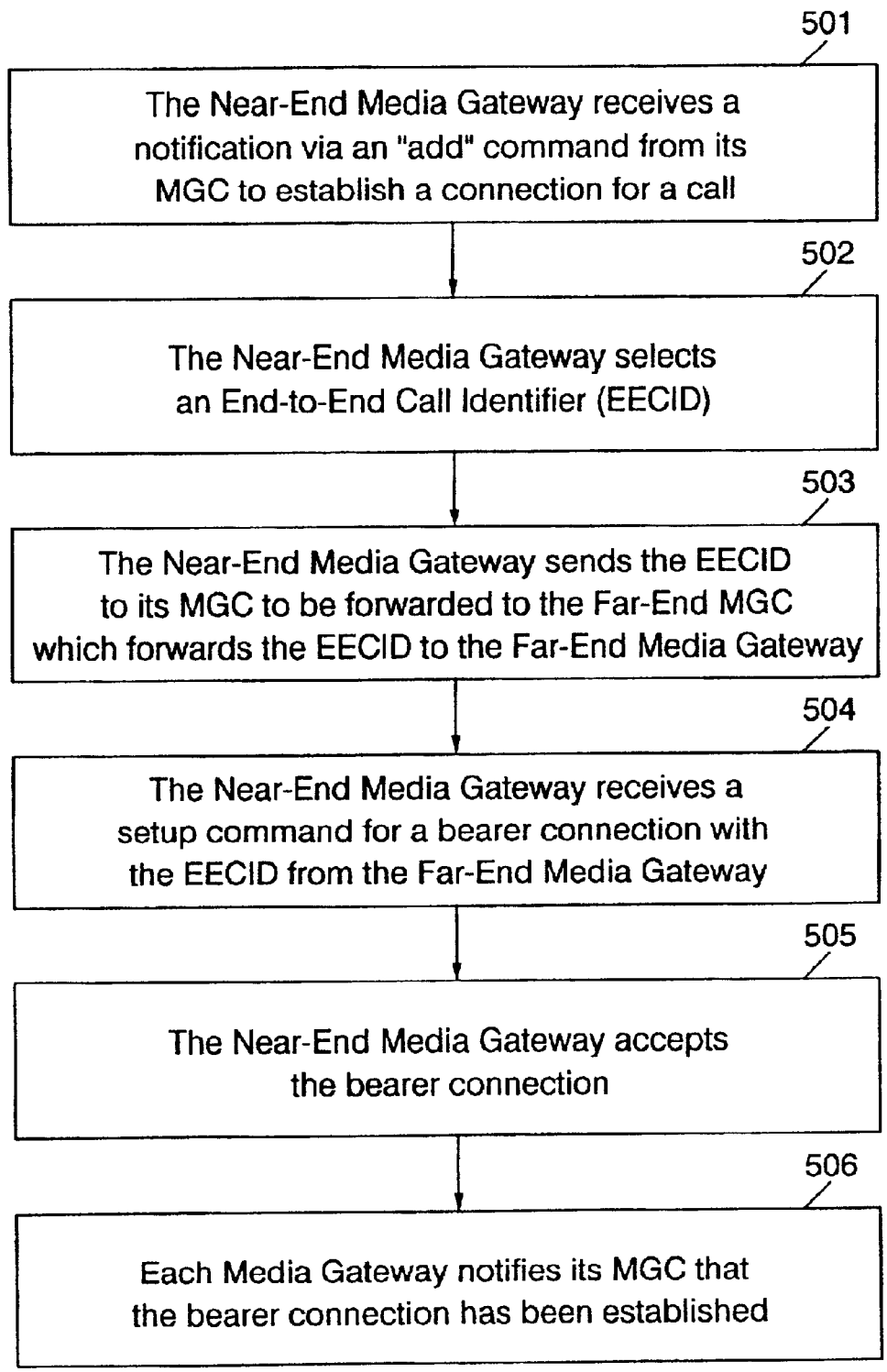
FIG. 5 is a flowchart illustrating the method according to one embodiment of the present invention.
Figure 6:
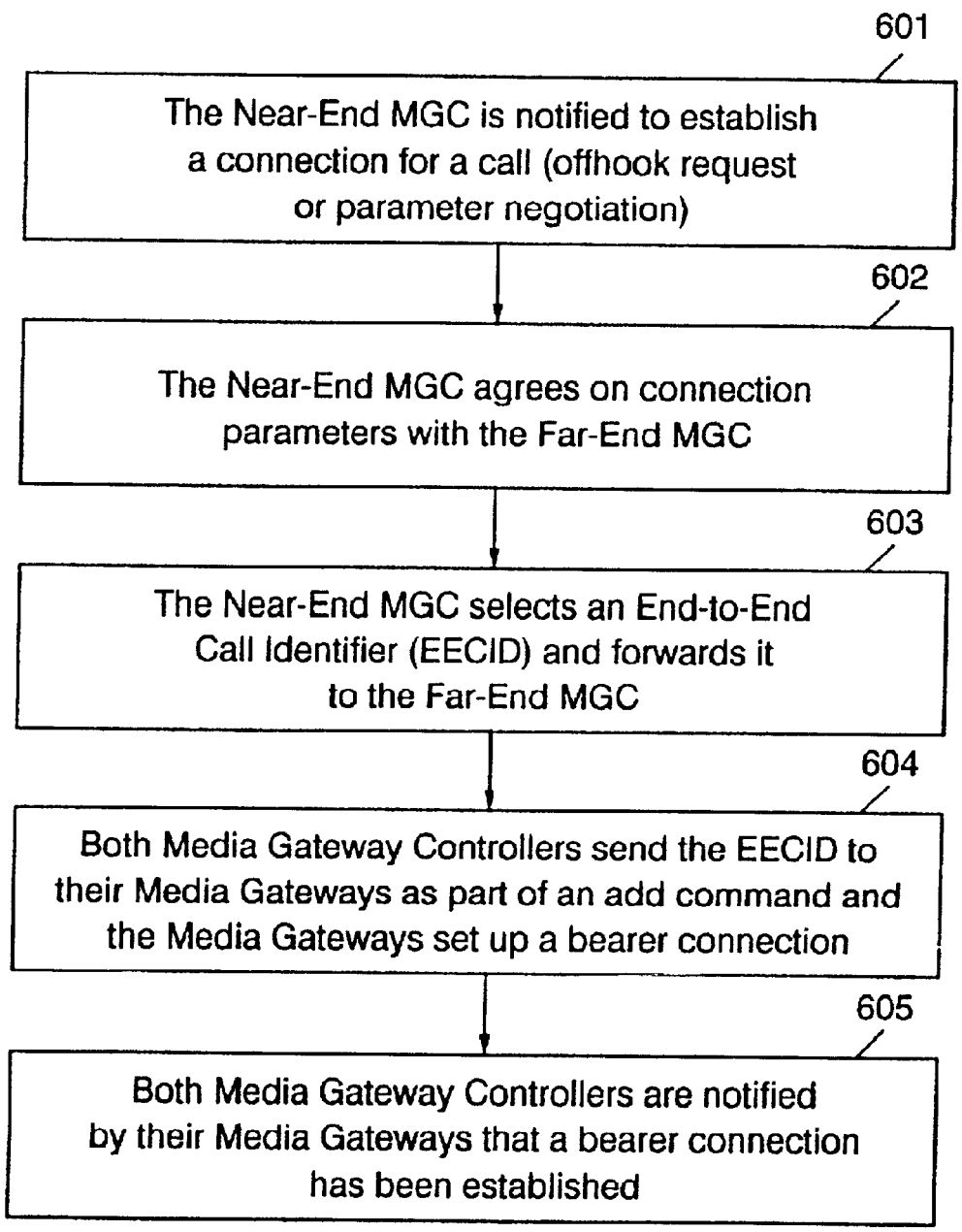
FIG. 6 is a flowchart illustrating the method according to another embodiment of the present invention.

FIG. 5 and FIG. 6 illustrate the overall method involved in moving the EECID across the network. FIG. 5 is a flow chart, which illustrates the steps performed in the near-end media gateway when a media gateway creates the EECID. At 501 the media gateway is instructed to establish a connection for a call. Usually, this instruction is an add command from an associated media gateway controller. At 602 the media gateway selects an EECID. At 503 the near-end media gateway sends the EECID to its MGC. The near-end MGC then sends the EECID to the far-end MGC for forwarding to the far-end media gateway. At 504 the near-end media gateway receives a setup command containing the EECID from the far end of the connection. At 505, the near-end media gateway accepts the bearer connection so that the EECID is associated with the bearer connection and the call. At 506 both media gateways notify their MGC's that the connection has been established. The media gateways are now maintaining a bearer connection tagged with the EECID.

FIG. 6 illustrates the method performed by a near-end media gateway controller for creating the EECID and associating it with a call. At 601 the media gateway controller is notified to establish a connection for a call. This notification comes as an offhook notification sent by the near-end media gateway if the near-end MGC is also the originating MGC. At 602 the MGC's agree on connection parameters, including which end will initiate bearer path setup. At 603 the near-end MGC selects the end-to-end call identifier and forwards it to the far-end MGC. At 604 both MGC's send the EECID to their associated media gateways, usually as part of an add command. The media gateways set up a connection. The media gateway chosen to set up the connection sends a setup command with the EECID to the other media gateway and the connection is accepted. At 605 both MGC's are notified by their respective media gateways that the bearer connection has been established.

It is preferable to include the EECID in the Megaco/H.248 protocol as part of the stream descriptor in addition to the local control descriptor, local descriptor, and remote descriptor. These descriptors are all part of the stream parameter, a known part of the Megaco/H.248 protocol. It is also possible to include the EECID in the Megaco/H.248 protocol as part of a session descriptor protocol (SOP) term. SOP is a well-known protocol, described in the previously cited IETF RFC 2327, which is used to describe packet terminations, such as IP and ATM terminations within the Megaco/H 0.248 protocol.

In addition to including the EECID in the Megaco/H.248 protocol, it must be included in other protocols and/or data streams that allow the network to communicate. It is especially important to include the EECID in the ATM cell structure used in the ATM transport network, since the media gateways on the ends of the ATM networks form the ends of the bearer channel carrying the part of the call leg which passes through the packet network. Assuming the packet network shown FIG. 3 and FIG. 4 is an ATM network implemented according to the UNI standard promulgated by the ATM forum, FIG. 7, at 702, 703, 704, and 705, illustrates the possible places in an ATM cell where the EECID can be placed. Network prefix 701 is a fixed, required part of the cell, used for routing. The EECID could be placed in the ATM user part, 702. ATM network routing only uses the first thirteen-byte network prefix of the ATM address. The following 7 bytes of the user part can be used to transport the EECID. Another possible place for the EECID is the ATM subaddressing field, 703. The subaddressing field usually only has local significance and can be dropped if it is unused. It can be adapted to implement the EECID of the present invention. Most non-UNI 4.0 compliant ATM networks are currently implemented without using a generic information transport/information element (GIT IE) field; however, the GIT IE field, 705, will probably be the best place for the EECID as that field becomes more widely used.

Figure 7:
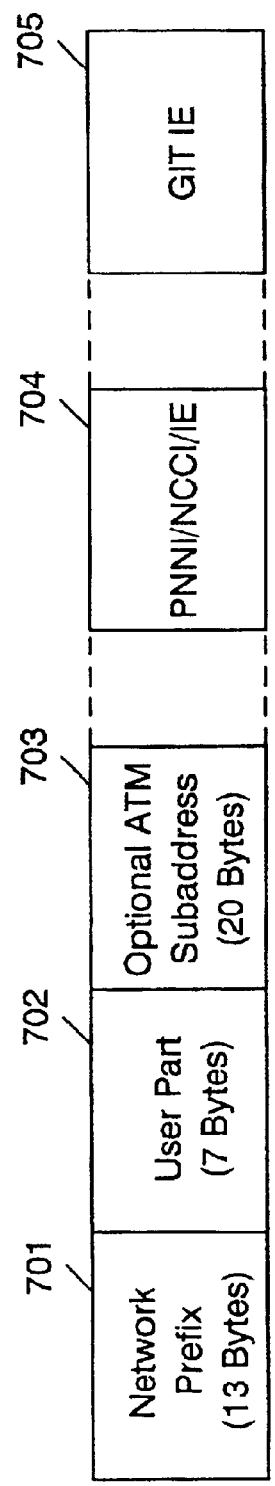
FIG. 7 illustrates the possible locations in an ATM header for the EECID of the present invention.
Figure 8:
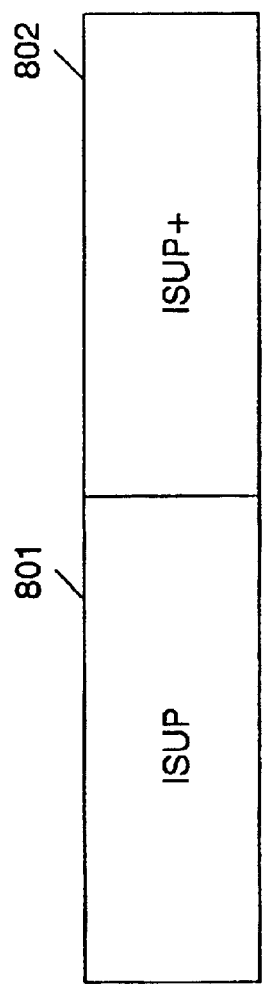
FIG. 8 illustrates the preferred location in an ISUP+ message for the EECID of the present invention.

It should be noted that the ATM UNI standard specifies the ATM interface for public networks. For private networks the private network to network interface (PNNI) describes the ATM interface. PNNI includes a network call correlation identifier/information element (NCCI/IE) 704 as shown in FIG. 7. The NCCI is used to uniquely identify a call in PNNI. Only one connection can exist per call therefore the NCCI can also be used to uniquely identify a connection associated with this call. The NCCI has limitations in that it can not be generated by an MGC or media gateway since the identifier is generated by an ATM edge switch for the setup of the actual network path to be used as the bearer path. In addition, the NCCI is a 28-byte field, making it unnecessarily large for the purpose of the EECID. The NCCI is inapplicable to frame relay networks The EECID must also be included in ISUP+ messages, if ISUP+ is used between the two gateway media controllers. FIG. 8 shows an ISUP+ message. Field 801 contains the ISUP information and 802 contains the ISUP+ information, which is essentially directed towards packet based networks, and includes an application transport mechanism field. The EECID is preferably included in the transport mechanism field.

If SIP+ is used between the two media gateway controllers, the EECID is carried as a term in the session description protocol (SDP). Syntax for the session description protocol, which includes the EECID, is "c=eecid: (eecid value)" or "a=eecid: (eecid value)." Note that the terms "c=eecid: (eecid value)" or "a=eecid: (eecid value)" need not be used if the stream descriptor is used to specify the EECID in the Megaco/H.248 protocol.

As previously discussed, either an MGC or a media gateway somewhere in the network selects the EECID, that is, determines a value for the EECID, before it can be associated with a call leg. The EECID can be any arbitrary number that is unique so as to allow correlation of the end-to-end network path between the two media gateways. The choice of the value for the EECID has implications for the call flow. In some cases, the value can only be derived by the network, as with the NCCI as discussed above. Preferably, the value of the EECID is not dependent on the underlying network architecture. A simple way to create an EECID is to simply have the device that is determining the EECID, generate a random number. It is also possible to use a number that is already associated with some part of the network.

A possible value to use for the EECID is a session-ID or call-ID. The session-ID is a random number passed from the MGC to the media gateway. The media gateway can then pass the session-ID to the far end media gateway as an EECID with its initial setup message. The session-ID can also be passed through ISUP+ messages. The session-ID would not be able to be used if the media gateway is to generate the EECID. The call-ID is similar to the session-ID. Both are specified to identify a call solely within an MGC or media gateway.

Finally, the most preferable value for the EECID, assuming a numerical value, which is associated with the network, is used, is the ATM supported backward network connection identifier (BNC-ID). The BNC-ID is four bytes long and is generated by the media gateway. The media gateway sends the BNC-ID to its media gateway controller for forwarding to the far-end. The BNC-ID is included in the setup command between media gateways to correlate the call.

There are multiple ways to set up and correlate a packet network call path so that an appropriate wait state for establishment of the path is manifested. In one embodiment, a package with a signal, called a "connection available" (coav) signal, that explicitly requests the establishment of the packet network path, an event, called a "connection available" (coav) event, that explicitly reports the successful completion of the path, and an event, called "connection not available" (cont), that explicitly reports the failure to establish the requested path, can be added to any protocol that is used for call control in any packet based network. Similarly, the package would include a signal, called a "connection not available" (cont) signal, that explicitly requests the release of the packet network path, and an event, called a "connection not available" (cont) event, that explicitly reports the successful release of the path. If the invention is used with the Megaco/H.248 protocol, these signals and events can be used alone, or with an existing provisional response mechanism implemented through the "transaction pending" command. The events and signals that are used in both of these alternatives are shown in the following table. The EECID, previously discussed, is an optional parameter for the coav and cont events, hence it is denoted with the letter O. If a media gateway fails to release a packet network path, the media gateway sends a report of failure (of) event to the media gateway controller. The continuity check, continuity response, and report failure are also part of this package, which we call the "packet pipe" event package:

| Symbol | Definition | R | S | Parameter(s) |
| --- | --- | --- | --- | --- |
| coav | bearer connection available | X | BR | EECID (O) |
| cont | bearer connection not available | X | BR | EECID (O) |
| co1 | continuity check | X | TO | |
| co2 | continuity response | X | TO | Duration |
| of | report failure | X | | Duration |

R specifies that each symbol is part of an event report. BR indicates a brief tone. TO indicates a timeout tone that stops after the amount of time specified by the duration parameter has passed. Note that the co1 and co2 signal/events are shown for illustrative purposes only to demonstrate the optional use of continuity testing in conjunction with the process of setting up a bearer path. These signals are not required to implement the present invention in Megaco/H.248.

The explicit request alternative has desirable characteristics. In particular, the use of explicit signals and events eliminates the need for the media gateway to maintain the state of an add transaction request. The explicit embodiment also reduces the transaction request state monitoring in the MGC, and eliminates the need for the media gateway to potentially send multiple transaction pending replies. The explicit signals and events also reduce complexity when multiple add commands are used in a single transaction.

When requesting establishment of a network path, an add command is sent to the media gateway, which then explicitly specifies the "connection available" (coav) signal and event. When requesting release of a network path, a subtract command is sent to the media gateway, which then explicitly specifies the "connection not available" (cont) signal and event. The coav signal is sent only to the ATM termination, which is responsible for the origination of the setup sequence of the network path. The transaction, which specifies these requests, is acknowledged on receipt. The media gateway manifests the coav signal for an ATM network. A notify message of the coav or the cont event is sent from the media gateway to the MGC upon a connection becoming available or upon failure to establish the connection, respectively.

Note that the use of the coav and cont signals are optional. If they are not used, the initiation of the establishment or release of the path is implied by the add or subtract command, respectively.

The continuity check and response can be used automatically by the media gateway without an instruction from the MGC. However, these two events/signals can also be requested by the MGC during call processing. An additional characteristic of this approach is that embedded signals and events can be used to allow for additional processing to be invoked automatically for such things as continuity checking of the network path.

An alternative way of making a connection request is based on the Megaco/H.248 provisional response "transaction pending" reply wait state. This command is used when a command is received but pending for completion of processing. The media gateway can respond to the MGC with a command "transaction pending" response, so that the MGC won't be blocked for the completion response. When the media gateway finishes executing the command, it can then send the "transaction reply" message to acknowledge that the original command has been successfully completed or has failed. In addition to using the coav signal explicitly, the connection request is expressed implicitly by the add command. The rationale behind this approach is that the packet connection does not exist until it is added to the context. Therefore, the add command implies setting up the bearer connection.

The EECID is present in either the stream descriptor or the termination descriptor for the network path. The media gateway must use the EECID to determine if it needs to initiate the network path setup. The media gateway will keep a record of all requests received from other media gateways for setup of a network path. When the add command is received, the media gateway will determine if a bearer path setup request with the specified EECID has been received. If a network path associated with the EECID exists, then the network path bearer connection already exists and the correlation is reported back to the MGC via a transaction reply. If no pending network path is found with the same EECID, then the path initialization is invoked. In this approach, there won't be a coav signal and bearer connection available event notification. If the media gateway determines that there will be sufficient delay setting up the bearer connection to cause the transaction request to time out, the media gateway will respond to the media gateway controller with a transaction pending response. Upon completing the bearer connection, the media gateway will respond to the MGC with a transaction reply indicating success or failure of the attempt.

The method described immediately above can incur processing overhead in determining whether or not network path setup is required. Another negative consideration is that there is no mechanism to use embedded signals and events to allow for automatic processing of subsequent actions such as continuity checking of the network bearer path. The MGC has to issue a separate message for continuity checking and response. This combination at least eliminates the need for the media gateway to search through pending network path requests to determine if a network path setup is required. If the coav signal is present, the setup will begin immediately. If the two embodiments are used simultaneously, accommodations have to be made to eliminate redundant messaging to report the completion of the add command and the coav or cont event.

To illustrate the detail of the invention, FIGS. 9–12 present detailed signal flows showing the successful setup of bearer path connections in a multimedia packet network. There are literally dozens of possible signal flows, which could be implemented to make use of the invention. The signal flows presented here should be considered as examples only. When we refer to implicit versus explicit setup, we are using the terminology discussed above for explicit versus implicit signaling and events. When we refer to forward setup versus backward setup we are referring to which end of the network is performing the bearer path setup relative to the originating end of the network. If the originating end of the network is also setting up the bearer connection we have a forward setup. If the originating end of the network is passing information to the terminating end and the terminating end is setting up the bearer connection, we have a backward setup. In reference to FIG. 9, all messages are discussed. For the other message flow diagrams, only new messages, which are important to illustrating the differences between those examples and previous examples, are discussed. The letters A and B correspond to the ends of the network path as shown in the network diagrams of FIGS. 3 and 4.

Figure 16:
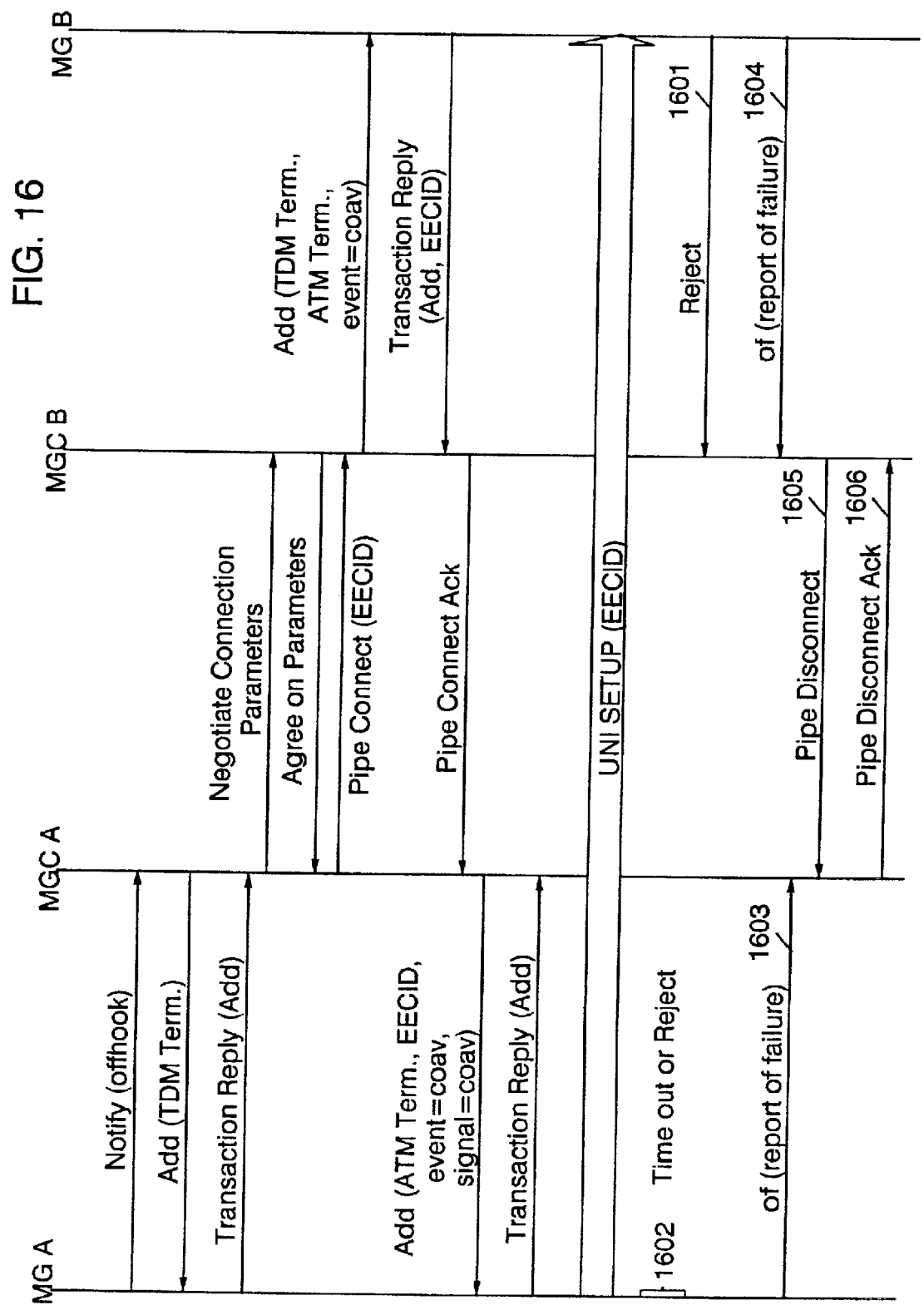
FIG. 16 is an additional message flow diagram that illustrates the invention.
Figure 17:
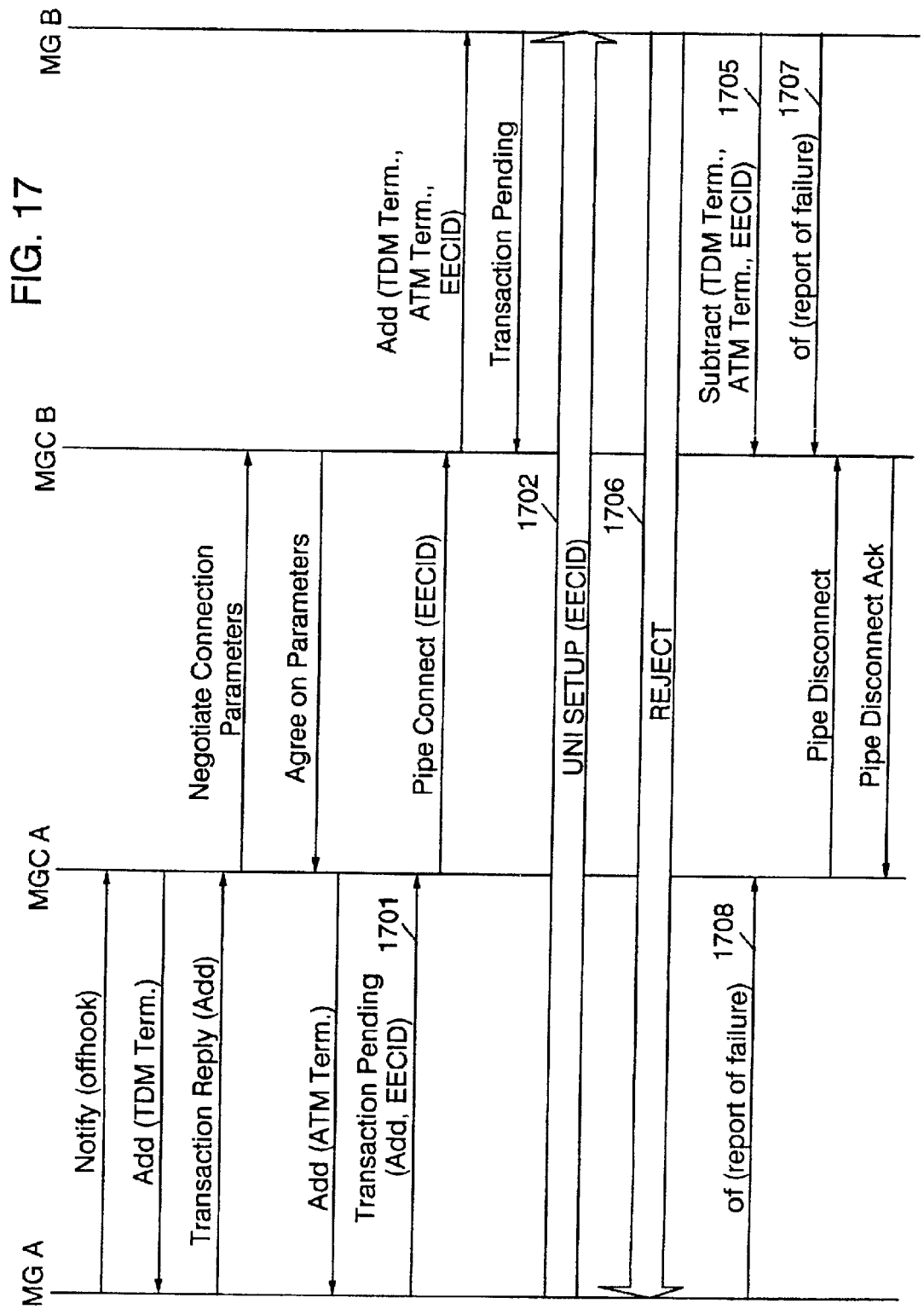
FIG. 17 is also an additional message flow diagram that illustrates the invention.

In FIGS. 9–12, and in FIGS. 16 and 17, the TDM termination is a logical representation of a TDM line and an ATM termination is a logical representation of an ATM network connection. Although an ATM termination is illustrated in all cases, the invention is not limited to use of an ATM network for the bearer connection. The invention is also applicable with other connection-oriented networks such as frame relay networks.

Figure 9:
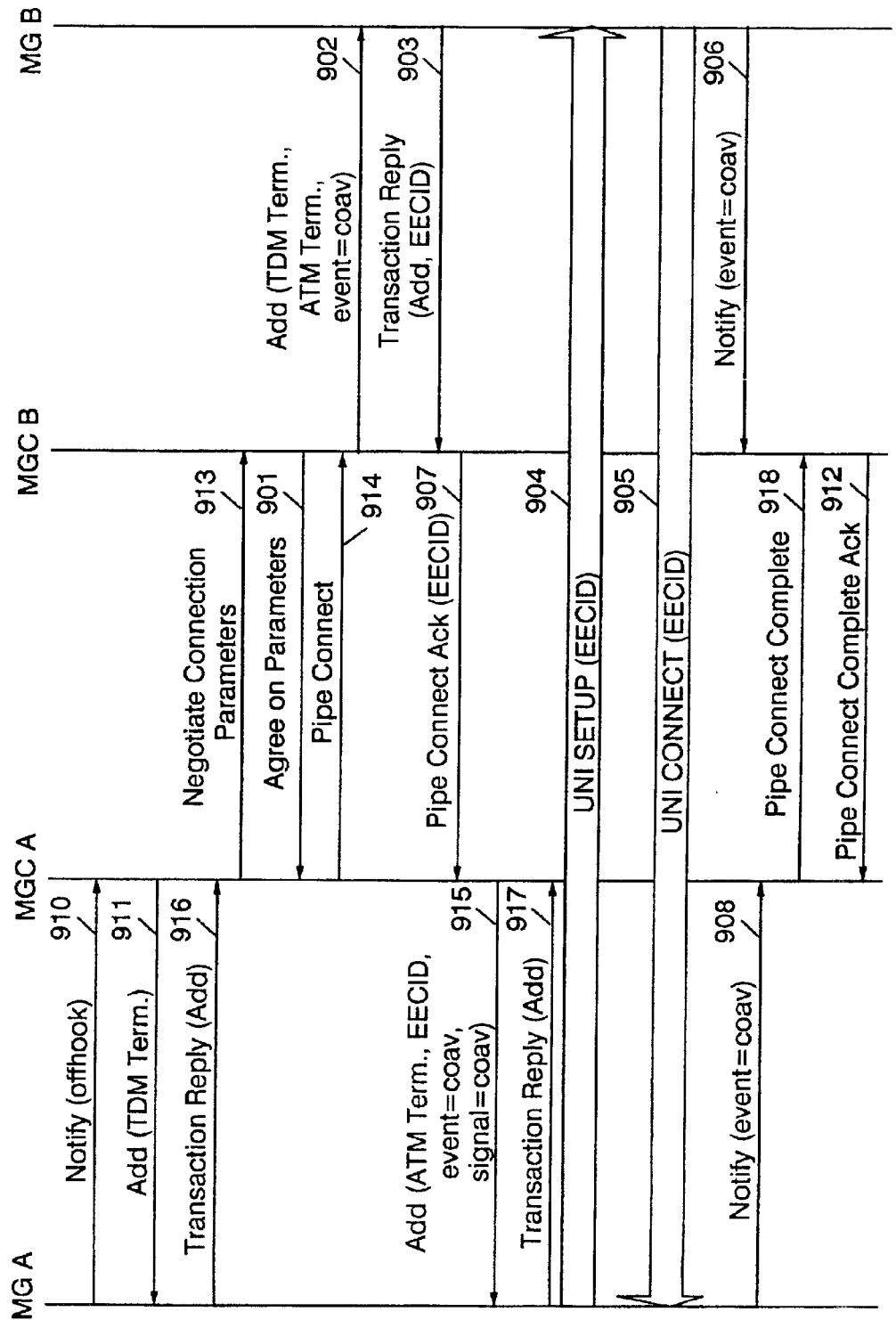
FIG. 9 is an example message flow diagram that illustrates the embodiment of the present invention where a media gateway creates the EECID.

Turning to FIG. 9, an explicit forward setup is illustrated. At 910, a notify message indicating an offhook condition is sent from media gateway A to MGC A. At 911, MGC A responds with an add command. At 916, media gateway A replies with a transaction reply. At 913 and 901, the two media gateway controllers negotiate connection parameters. At 914, MGC A sends a pipe connect request to MGC B. In this case, at 902, MGC B sends an add command to media gateway B with explicit instructions for setting up the bearer path with the connection signal coav and the event coav when the connection is available. At 903, media gateway B immediately responds to MGC B, with a transaction reply signal; the transaction reply signal is in response to an add command. This transaction reply does not mean that the add command is completed. Rather, the transaction reply simply means that media gateway B is working on adding the ATM termination. Media gateway B chooses an EECID at 902 and sends the EECID back to MGC B at 903. MGC B passes the EECID to MGC A at 907. At 915, MGC A sends the add command with the EECID and explicit event and signal coav. Media gateway A immediately replies to MGC A with a transaction reply at 917. At 904, the UNI setup message is sent from media gateway A through the ATM network to media gateway B. A connect message is sent from media gateway B to media gateway A to indicate the bearer path is accepted at 905. Media gateway B uses the EECID to associate the call and the bearer path. This prevents an unauthorized bearer connection from being set up. Then MGC B notifies media gateway B at 906.

After receiving a UNI connect message from media gateway B, media gateway A notifies MGC A that the coav event has occurred at 908. In the above example, the MGC B cannot add the ATM termination until the UNI service has been set up. This limitation comes about because the EECID is needed to create the ATM termination. At 918, MGC B is notified by MGC A through ISUP+ or other means that the bearer path (packet pipe) connection has been established. The process is completed with the pipe connect complete ack message at 912.

Figure 10:
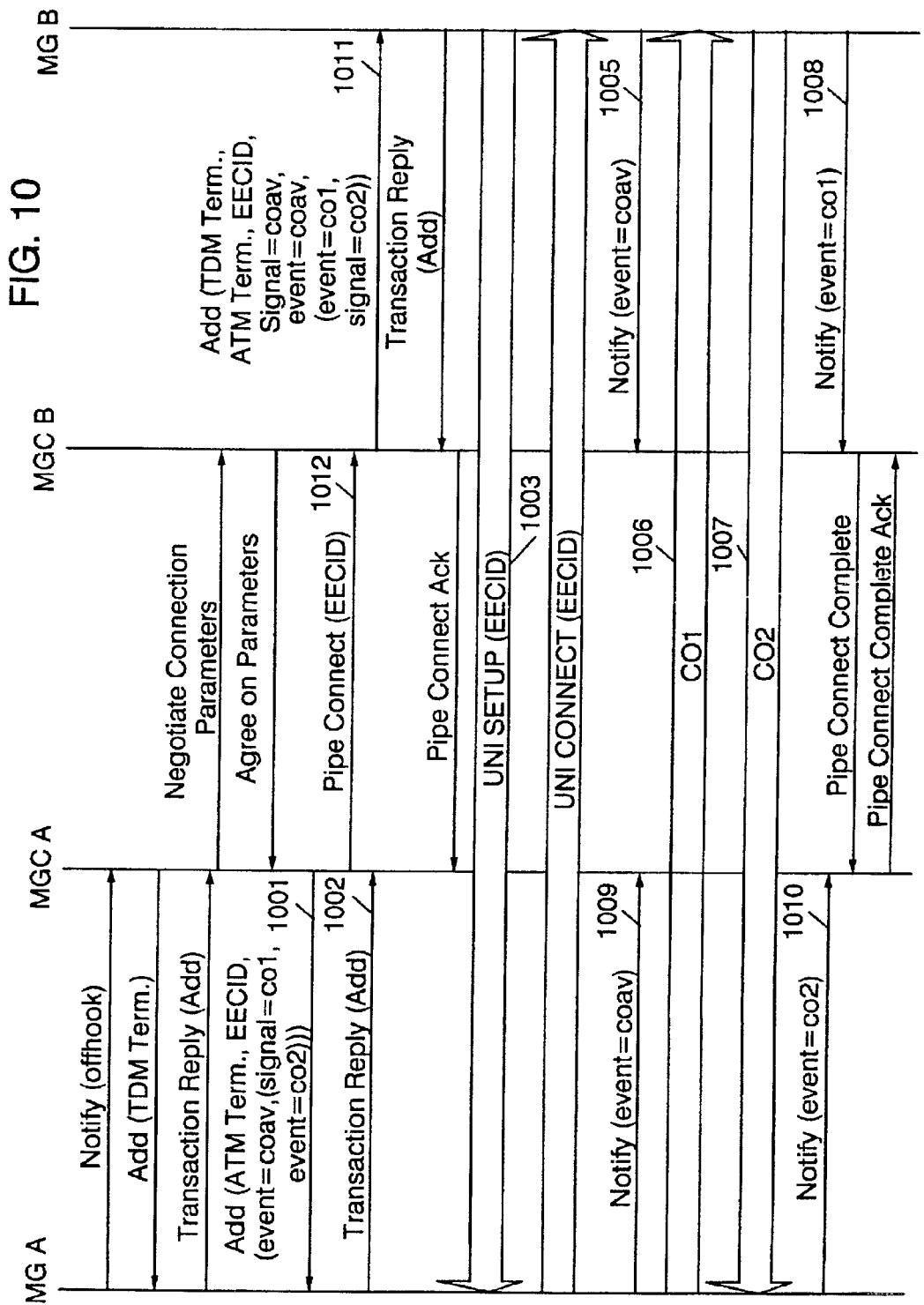
FIG. 10 is an example message flow diagram that illustrates the embodiment of the present invention where an MGC creates the EECID.

FIG. 10 illustrates the signal flows for explicit backward setup. At 1001, MGC A chooses the EECID and passes it to media gateway A. There is an embedded continuity check applied after the coav event occurs and there is a return continuity check associated with the continuity check event. At 1012, MGC A passes the EECID to MGC B. At 1002, media gateway A sends a transaction reply to the add command to acknowledge that the transaction is accepted. Once again, the add command has not been fully executed. At 1011, MGC B sends an add command to MG B. This command asks for a bearer path to be set up using signal=coav. At 1003, media gateway B sends the ATM UNI setup message with an EECID to media gateway A. An event notification on coav with embedded event co1 and signal co2 is explicitly requested. Upon receipt of continuity check co1 response co2 will be given. This command also asks for a bearer path to be set up using signal=coav. After the connection is set up, media gateway B responds at 1005 with a coav event. At 1009 MG A also notifies MGC A that event=coav has occurred. At 1006, the continuity check signal is applied by media gateway A since the coav has occurred. At 1007, media gateway B applies the continuity check response signal since it receives the continuity check event. At 1008, media gateway B notifies its media gateway controller that the continuity check event has occurred. Similarly, media gateway A notifies its media gateway controller that the coav and the continuity check return events have both occurred at 1010.

Figure 11:
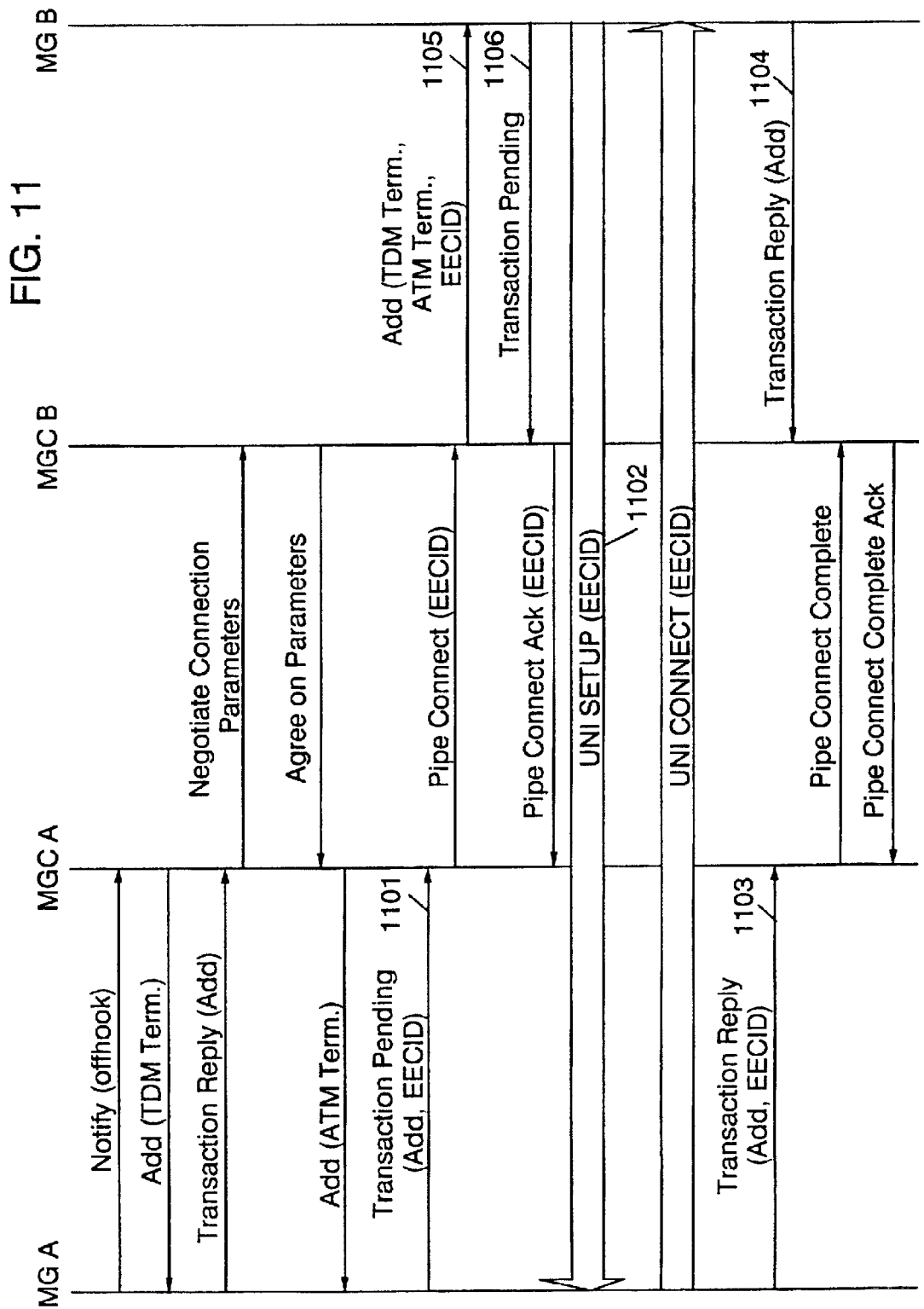
FIG. 11 is another example message flow diagram that illustrates the embodiment of the present invention where a media gateway creates the EECID.

FIG. 11 illustrates the message flows for implicit backward setup. In this case, the EECID is assigned by the media gateway. At 1101, media gateway A chooses the EECID and sends a transaction pending response with the EECID to its media gateway controller so that the media gateway controller waits for the setup. At 1102, media gateway B passes the EECID in the UNI setup message to media gateway A. At 1103, when the connection setup is complete, media gateway A sends a transaction reply to the add command and the EECID to media gateway controller A. At 1104, media gateway B sends a transaction reply to the add command to MGC B.

Figure 12:
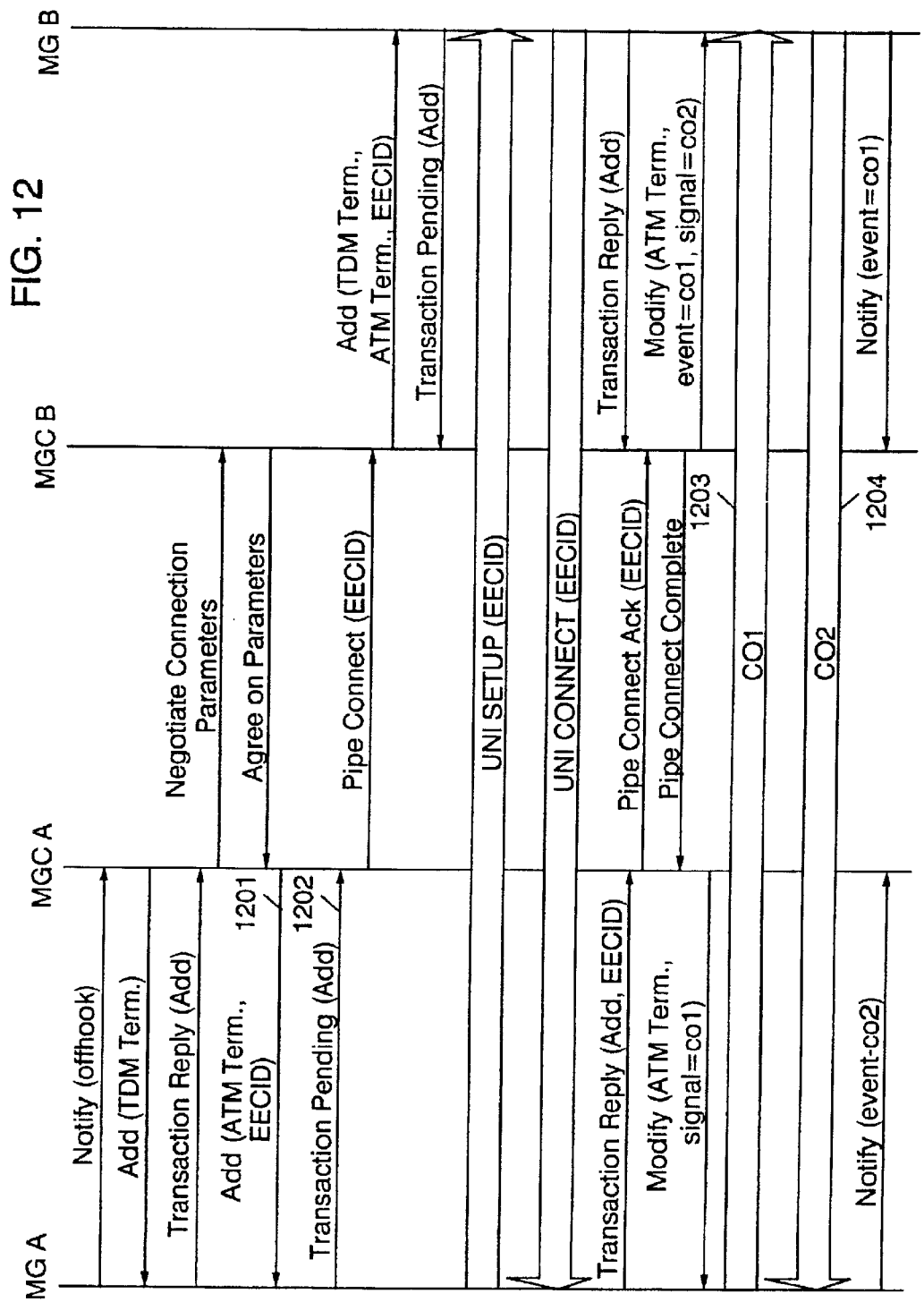
FIG. 12 is another example message flow diagram that illustrates the embodiment of the present invention where an MGC creates the EECID.

FIG. 12 also illustrates an implicit forward setup. In this case a media gateway controller creates the EECID. Also, the co1 and co2 continuity checking messages are used. At 1201, an add command with the EECID is sent from media gateway controller A to media gateway A. At 1202, media gateway A responds to its MGC with a transaction pending command. Note that media gateway A still uses the EECID for establishing the connection with media gateway B. 1203 and 1204 illustrate the continuity check and continuity check response, respectively.

FIGS. 16 and 17 illustrate what happens when a failure occurs. In FIG. 16, at 1601, MG B can't accept the UNI setup due to an error. Any number of things could cause the error. One possibility is that there is no EECID known at MG B that matches the one in the UNI setup message. At 1604, MG B reports failure (of) to MGC B. At 1602 MG A times out or receives a reject message from MG B. MG A reports failure (of) to MGC A at 1603. At 1605, and 1606, MGC a and MGC B exchange messages to disconnect the pipe connection. Messages like that shown at 1605 and 1606 can come from either MGC A or MGC B.

In FIG. 17, the EECID is created and sent from MG A to MGC A at 1701. MG A sends the UNI setup message at 1702, but it is rejected at 1706. After the add command is confirmed at 1705, a report of failure (of) is sent from MG A to MGC A at 1708. A report of failure is also sent from MG B to MGC B at 1707.

Figure 13:
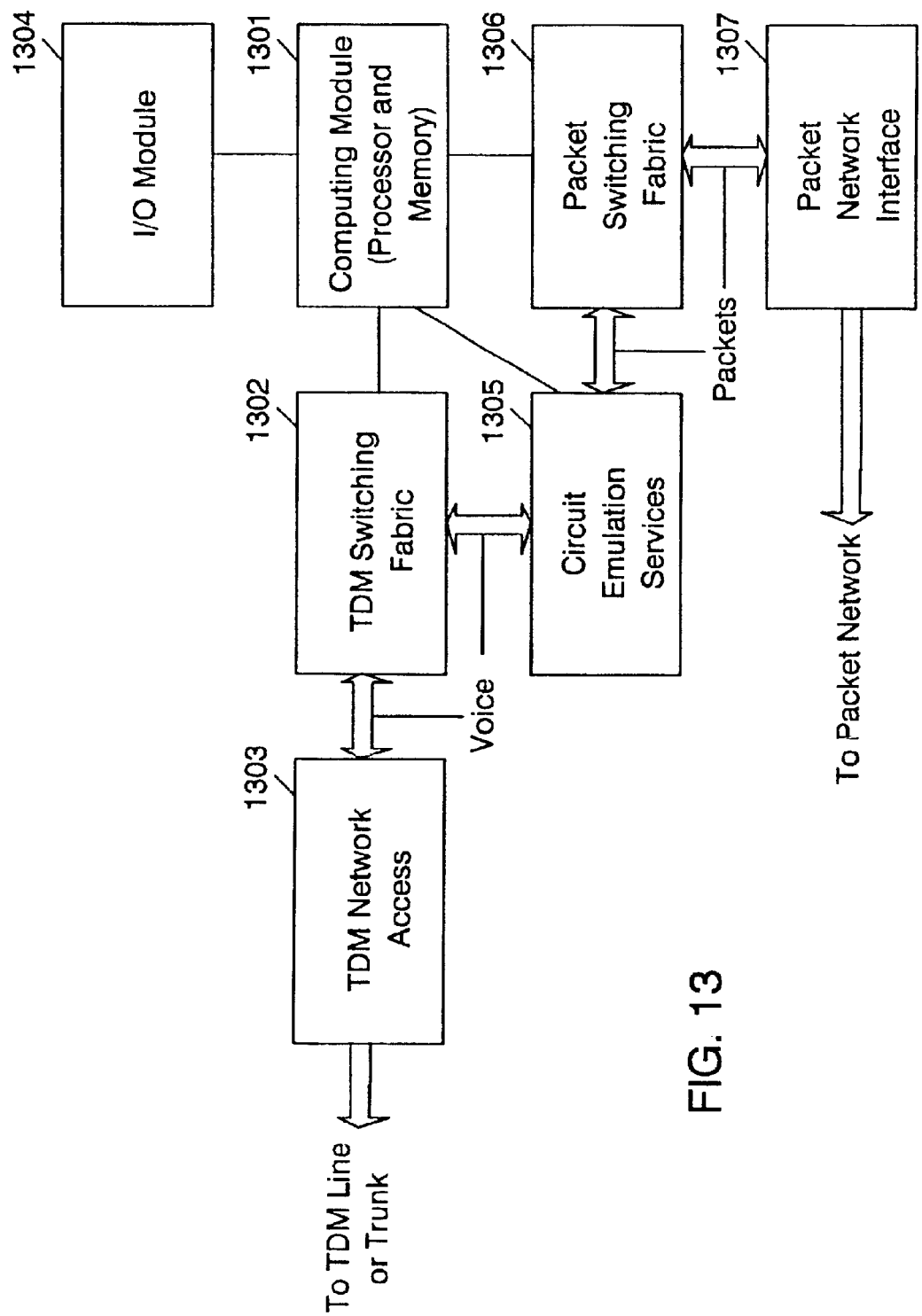
FIG. 13 is a block diagram of a media gateway that implements the present invention.

FIG. 13 illustrates a conceptual, functional block diagram of a switching system which can be used to implement a media gateway, which in turn implements the invention. Computing module 1301 includes a central processing unit, memory, and supporting circuitry. This computing module, together with any computer program code stored in the memory, is the means for controlling the overall operation of the switching system to perform the method of the invention. TDM switching fabric 1302 is for switching TDM channels and is controlled by the computing module. Input/output (I/O) module 1304 is also connected to the processor of computing module 1301 and includes media devices to load computer program code as well as connections for workstations or other equipment for control and maintenance of the switching system. TDM network access module 1303 serves as a TDM network interface and is connected to TDM switching fabric 1302, both of which are managed by the computing module 1301. Circuit emulation system 1305 provides circuit emulation services, converting TDM voice to packets such as ATM cells. Packet switching fabric 1306 sends and receives packets on the packet network through packet network interface 1307.

Figure 14:
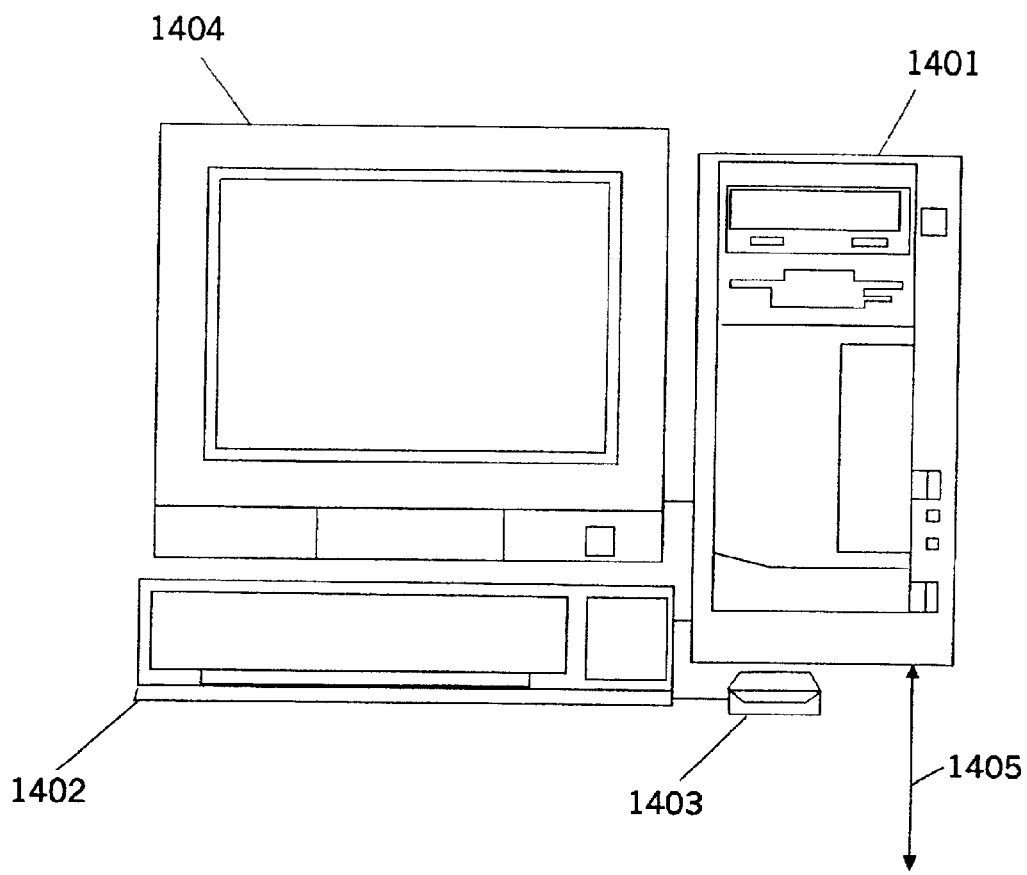
FIG. 14 is drawing of one implementation of a media gateway controller that implements the present invention.

FIG. 14 illustrates a workstation, which can be used to implement a media gateway controller according to the present invention. I/O devices such as keyboard 1402, mouse 1403 and display 1404 are used to control the system. One or more of these devices may not be present in normal operation. System unit 1401 is connected to all devices and contains in memory, media devices, and a central processing unit (CPU) all of which together form the means to implement the present invention. Network interfaces are normally implemented via adapter cards plugged into a bus, however, for the sake of simplicity they are shown graphically as interface 1405.

Figure 15:
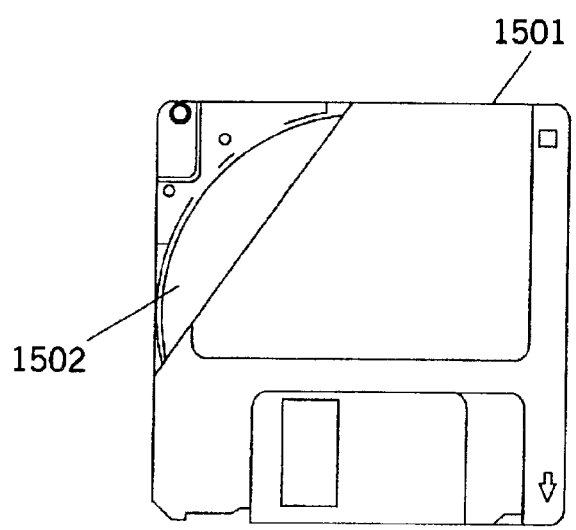
FIG. 15 shows an example of a media which stores software that implements the present invention.

As previously mentioned, appropriate computer program code in combination with appropriate hardware implements most of the elements of the present invention. This computer program code is often stored on storage media. This media can be a diskette, hard disk, CD-ROM, or tape. The media can also be a memory storage device or collection of memory storage devices such as read-only memory (ROM) or random access memory (RAM). Additionally, the computer code can be transferred to the workstation over the Internet or some other type of network. FIG. 15 illustrates one example of a media. FIG. 15 shows a diskette of the type where magnetic media 1502 is enclosed in a protective jacket 1501. Magnetic field changes over the surface of the magnetic media 1502 are used to encode the computer program code. In this way the computer program code is stored for later retrieval.

We have described specific embodiments of our invention, which provides an end-to-end call identifier (EECID) to uniquely identify a call leg across a packet network, regardless of the number of nodes used in completing the network path. One of ordinary skill in the networking and computing arts will quickly recognize that the invention has other applications in other environments. In fact, many embodiments and implementations are possible. The following claims are in no way intended to limit the scope of the invention to the specific embodiments described.

We claim:

1. In a media gateway, a method of identifying a connection for a call, the method comprising the steps of:

receiving a command from an associated media gateway controller to establish the connection for the call;

determining a value for an end-to-end call identifier (EECID);

sending the EECID to the associated media gateway controller;

establishing the connection for the call with a far-end media gateway so that the EECID is associated with the connection and the call; and notifying the associated media gateway controller that the connection has been established.

2. The method of claim 1 wherein the value of the EECID is a randomly generated number.

3. The method of claim 1 wherein the value of the EECID is the same as that of a network call correlation identifier.

4. The method of claim 1 wherein the value of the EECID is the same as that of a backward network connection identifier.

5. In a media gateway controller, a method of identifying a connection for a call, the method comprising the steps of:

receiving a notification to establish the connection;

negotiating connection parameters with a far-end media gateway controller;

determining a value for an end-to-end call identifier (EECID);

sending the EECID to an associated media gateway and to the far-end media gateway controller so that the EECID is associated with the connection and the call; and receiving a notification from the associated media gateway that the connection has been established.

6. The method of claim 5 wherein the notification to establish a connection is an offhook notification.

7. The method of claim 5 wherein the notification to establish a connection is a request to negotiate parameters, the request being received from the far-end media gateway controller.

8. The method according to any of claims 5 through 7 wherein the value of the EECID is a randomly generated number.

9. The method according to any of claim 5 through 7 wherein the value of the EECID is the same as that of session-ID.

10. The method according to any of claims 5 through 7 wherein the value of the EECID is the same as that of a backward network connection identifier.

11. The method according to any of claims 5 through 7 wherein the value of the EECID is the same as that of a call-ID.

12. A computer program product for enabling a media gateway to identify a connection for a call, the computer program product including a media with a computer program embodied therein, the computer program comprising:

computer program code for receiving a command from an associated media gateway controller to establish the connection for the call;

computer program code for determining a value for an end-to-end call identifier (EECID);

computer program code for sending the EECID to the associated media gateway controller;

computer program code for establishing the connection for the call with a far-end media gateway so that the EECID is associated with the connection and the call; and computer program code for notifying the associated media gateway controller that the connection has been established.

13. The computer program product of claim 12 wherein the value of the EECID is a randomly generated number.

14. The computer program product of claim 12 wherein the value of the EECID is the same as that of a network call correlation identifier.

15. The computer program product of claim 12 wherein the value of the EECID is the same as that of a backward network connection identifier.

16. A computer program product for enabling a media gateway controller to identify a connection for a call, the computer program product including a media with a computer program embodied therein, the computer program comprising:

computer program code for receiving a notification to establish the connection;

computer program code for negotiating connection parameters with a far-end media gateway controller;

computer program code for determining a value for an end-to-end call identifier (EECID);

computer program code for sending the EECID to an associated media gateway and to the far-end media gateway controller so that the EECID is associated with the connection and the call; and;

computer program code for receiving a notification from the associated media gateway that the connection has been established.

17. The computer program product of claim 16 wherein the notification to establish a connection is an offhook notification.

18. The computer program product of claim 16 wherein the notification to establish a connection is a request to negotiate parameters, the request being received from the far-end media gateway controller.

19. A switching system including a computing module and associated switching fabrics and network interfaces, the switching system operable as a media gateway which is programmed to identify a connection for a call by performing the steps of:

receiving a command from an associated media gateway controller to establish the connection for the call;

determining a value for an end-to-end call identifier (EECID);

sending the EECID to the associated media gateway controller;

establishing the connection for the call with a far-end media gateway so that the EECID is associated with the connection and the call; and notifying the associated media gateway controller that the connection has been established.

20. The switching system of claim 19 wherein the value of the EECID is a randomly generated number.

21. The switching system of claim 19 wherein the value of the EECID is the same as that of a network call correlation identifier.

22. The switching system of claim 19 wherein the value of the EECID is the same as that of a backward network connection identifier.

23. A computer system operable as a media gateway controller which is programmed to identify a connection for a call by performing the steps of:

receiving a notification to establish the connection;

negotiating connection parameters with a far-end media gateway controller;

determining a value for an end-to-end call identifier (EECID);

sending the EECID to an associated media gateway and to the far-end media gateway controller so that the EECID is associated with the connection and the call; and receiving a notification from the associated media gateway that the connection has been established.

24. The computer system of claim 23 wherein the notification to establish a connection is an offhook notification.

25. The computer system of claim 23 wherein the notification to establish a connection is a request to negotiate parameters, the request being received from the far-end media gateway controller.

26. Apparatus operable to identify a connection for a call in a packet network, the apparatus comprising:

means for receiving a command from an associated media gateway controller to establish the connection for the call;

means for determining a value for an end-to-end call identifier (EECID);

means for sending the EECID to the associated media gateway controller; and means for establishing the connection for the call with a far-end media gateway so that the EECID is associated with the connection and the call.

27. Apparatus which associates an end-to-end call identifier with a connection for a call, the apparatus comprising:

means for receiving a notification to establish the connection;

means for computer program code for negotiating connection parameters with a far-end media gateway controller;

means for determining a value for an end-to-end call identifier (EECID); and means for sending the EECID to an associated media gateway and to the far-end media gateway controller so that the EECID is associated with the connection and the call.

28. In a multimedia packet network, a method of identifying a connection for a call comprising the steps of:

at a media gateway controller, notifying an associated media gateway to establish the connection for the call;

determining a value for an end-to-end call identifier (EECID) at the associated media gateway;

sending the EECID from the associated media gateway to the media gateway controller so that the EECID is associated with the connection and the call at all media gateways and media gateway controllers involved in the call; and establishing the connection for the call at the associated media gateway and notifying the media gateway controller that the connection has been established.

29. In a multimedia packet network, a method of identifying a connection for a call comprising the steps of:

receiving a notification at a media gateway controller to establish a connection for a call;

negotiating connection parameters at the media gateway controller;

selecting an end-to-end call identifier (EECID) at the media gateway controller;

notifying an associated media gateway of the EECID as part of a command issued to the associated media gateway by the media gateway controller to establish the connection; and establishing the connection for the call at the associated media gateway.

30. A multimedia packet network including at least one media gateway controller connected to an associated media gateway, the media gateway controller operable to control the associated media gateway, the media gateway controller and the associated media gateway programmed to enable the identification of a connection for a call by performing the steps of:

notifying the associated media gateway to establish the connection for the call;

determining a value for an end-to-end call identifier (EECID) at the associated media gateway;

sending the EECID from the associated media gateway to the media gateway controller so that the EECID is associated with the connection and the call at all media gateways and media gateway controllers involved in the call; and establishing the connection for the call at the associated media gateway and notifying the media gateway controller that the connection has been established.

31. A multimedia packet network including at least one media gateway controller connected to an associated media gateway, the media gateway controller operable to control the associated media gateway, the media gateway controller and the associated media gateway programmed to enable the identification of a connection for a call by performing the steps of:

receiving a notification at the media gateway controller to establish a connection for a call;

negotiating connection parameters at the media gateway controller;

selecting an end-to-end call identifier (EECID) at the media gateway controller;

notifying an associated media gateway of the EECID as part of a command issued to the associated media gateway by the media gateway controller to establish the connection; and establishing the connection for the call at the associated media gateway.

* * * * *